United States Patent
Saito et al.

(10) Patent No.: US 6,712,594 B2
(45) Date of Patent: Mar. 30, 2004

(54) INSERT MOLDING METHOD AND METAL MOLD

(75) Inventors: Toshio Saito, Tokyo (JP); Ikuhiko Ozeki, Kohnan (JP)

(73) Assignee: Fisa Corporation, Tokyo (JP)

( * ) Notice: Subject to any disclaimer, the term of this patent is extended or adjusted under 35 U.S.C. 154(b) by 19 days.

(21) Appl. No.: 09/994,627

(22) Filed: Nov. 28, 2001

(65) Prior Publication Data

US 2002/0180105 A1 Dec. 5, 2002

(30) Foreign Application Priority Data

Dec. 14, 2000 (JP) ..................... P2000-380154

(51) Int. Cl.[7] .................... B29C 45/14; B29C 70/72; H01L 21/56
(52) U.S. Cl. .................... 425/125; 249/96; 249/158; 425/127
(58) Field of Search ................ 425/125, 127, 425/DIG. 44; 249/96, 158

(56) References Cited

U.S. PATENT DOCUMENTS

| | | | |
|---|---|---|---|
| 3,712,575 A | | 1/1973 | Bement et al. ............... 249/91 |
| 4,044,984 A | * | 8/1977 | Shimizu et al. ............... 249/95 |
| 4,076,791 A | * | 2/1978 | Barter et al. ............ 264/272.15 |
| 4,697,784 A | * | 10/1987 | Schmid ...................... 249/119 |
| 4,779,835 A | * | 10/1988 | Fukushima et al. ......... 249/161 |
| 5,059,105 A | * | 10/1991 | Baird ........................ 425/116 |
| 5,074,779 A | * | 12/1991 | Tsutsumi et al. ............ 425/444 |
| 5,484,274 A | * | 1/1996 | Neu ............................ 425/116 |
| 5,626,886 A | * | 5/1997 | Ishii ............................ 425/116 |
| 5,779,958 A | * | 7/1998 | Nishihara et al. ........... 264/161 |
| 5,997,798 A | * | 12/1999 | Tetreault et al. ............ 264/510 |
| 6,019,588 A | * | 2/2000 | Peters et al. ................ 425/125 |
| 6,090,322 A | | 7/2000 | Tsurutani et al. ......... 425/129.1 |
| 6,193,493 B1 | * | 2/2001 | Steijer et al. ............... 425/116 |

FOREIGN PATENT DOCUMENTS

EP 1157801 11/2001 .......... B29C/45/14

* cited by examiner

Primary Examiner—Robert B. Davis
(74) Attorney, Agent, or Firm—Roylance, Abrams, Berdo & Goodman, LLP

(57) ABSTRACT

A method for injection molding of resin or rubber at an insert positioned in a lower mold injects and fills melted resin or rubber into a cavity of an upper mold through a gate. The lower metal mold has a flexible supporting member supporting the mold insert. The supporting member is vertically movable in a recess formed on the upper surface of the lower mold. The underside thereof is supported by the tip ends of shafts of pressing members that operate independently. The movable supporting member is moved while being pressed by the respective shafts of the pressing members to the upper mold at a plurality of positions. The resin or rubber is molded when the upper surface of the insert uniformly contacts the underside of the upper mold by bending of the movable supporting member.

2 Claims, 6 Drawing Sheets

INSERT MOLDING METHOD AND METAL MOLD

BACKGROUND OF THE INVENTION

1. Field of the Invention

The present invention relates to an insert molding method and a metal mold therefor, that are used for molding a synthetic resin or rubber (hereinafter called "insert molding") in a state where an insert (a work) is disposed in advance in a metal mold.

2. Description of the Prior Art

The insert molding is a method for injection molding of synthetic resin, etc., in a state where a pre-molded article called an insert or a work is disposed in advance in a molding metal mold, and forming a resin molding part on the upper surface and circumferential side of the insert. The insert molding has been widely utilized in production of various types of electronic components. Also, the insert molding is applicable to various types of resin molding methods. However, the present invention is limited to an injection molding method.

An insert disposed in a metal mold may be a resin molded component (plate-shaped, bar-shaped, or box-shaped, or of other shapes) that has already been processed, or a component made of a different type of material such as metal, glass, ceramic, carbon, etc.

There are many cases where the inserts are not necessarily accurately produced with respect to dimensional standards, for example, if an insert that is uneven in the thickness dimension thereof is disposed in a metal mold and injection molding is carried out, a gap is produced on the contacting surface between a part of the insert and the upper mold even if the molds are tightened, and injected resin is caused to flow out through the part to become burrs.

A detailed description thereof is given with reference to the accompanying drawings. As shown in FIG. 6-A, in a case where an insert 1 is plate-shaped, its finishing accuracy thereof is not satisfactory, and a difference of h1<h2 is produced with respect to the thickness thereof, the insert 1 is set on the upper surface of the lower mold 2 and the molds are tightened, wherein the side having a larger thickness (the h2 side) on the upper surface of the insert 1 is brought into contact with the underside of the upper mold 3, and clearance is produced at the side (the h1 side) having a smaller thickness. Speaking in a different way, since the insert 1 is inclined, clearance is produced at the circumference of the lower surface of a cavity 4 (recess) prepared on the upper mold 3 side. The cavity 4 is a part that is molded with a synthetic resin. Therefore, if synthetic resin is injected through a gate 5 in a state such clearance is produced below the circumference of the lower surface of the cavity 4, burrs 7 are produced at the lower end part of a resin molded component 6 as shown in FIG. 6-B.

Particularly, since resin is injected at a high-pressure level in the injection molding method, resin may leak through remarkably minute clearance or gaps and burrs are likely to occur. In order to prevent burrs from being produced, if the injection pressure is set to a lower level, inconveniences are brought about in accuracy and physical properties of the molded articles.

Several attempts have already been made in regard to improvement in preventing the above-described burrs from being produced in the insert molding. The result was disclosed in, for example, Japanese Unexamined Patent Publication No. Hei-8-288326, etc.

SUMMARY OF THE INVENTION

The Object of the Invention

A problem regarding generation of burrs in the insert molding is a critical defect resulting in defective or useless insert products. Also, the problem results in an increase in production costs due to the occurrence of a necessity to remove burrs in addition to generation of production losses. It is therefore an urgent matter to solve such a problem.

The above-described Japanese Unexamined Patent Publication No. Hei-8-288326 described prevention of burrs from occurring by absorbing unevenness in insert thickness by supporting the underside of a supporting member on which an insert is placed by means of a resilient member (a plurality of string-wound springs) However, since the dimensional unevenness of inserts are not fixed but include various levels in unevenness, a completely satisfactory solution could not be achieved by supporting the inserts by a plurality of springs by which a uniform force is applied to the supporting member of the inserts.

In addition, as described above, there are a great many types of inserts, for example, not only metal inserts that are press-worked, and synthetic resin inserts, but also ceramic, carbon, and glass inserts that are likely to be broken with only a low impact force. In particular, in the case of the latter ones, which are uneven in terms of the outer dimensional evenness, there arise cases where the inserts disposed in the mold are broken when tightening the molds, thereby resulting in losses in products.

The present applicant disclosed an insert molding method and a metal mold, which are excellent in prevention of the above inserts from being broken, prevention of burrs from occurring, and production, operation and maintenance at metal molds, with Japanese Patent Application No. 2000-149547.

The insert molding method (metal mold for insert molding) according to the above-described preceding invention is an insert molding method (a metal mold for insert molding) for injection molding of resin or rubber at an insert set in a lower mold by injecting and filling melted resin or rubber into a cavity of an upper mold through a gate in a state where the upper mold and lower mold are disposed so as to be opposed to each other, wherein a movable supporting member for setting the above-described insert is inserted into and placed in a recess formed on the upper surface of the above-described lower mold, the position of the center of gravity on the underside of the movable supporting member is supported by the tip end of a shaft of a pressing mechanism and is pressed to the upper mold side, and the above-described movable supporting member is inclined centering around the pressing and supporting point by the corresponding shafts in the above-described recess so that, by causing a gap to exist between the side portion of the above-described recess and the side of the movable supporting member, the upper surface of the insert is evenly brought into surface contact with the underside of the upper mold.

As has been made clear in the above description, the preceding invention was constructed so that the position of the center of gravity of the underside of the movable supporting member is pressed in the direction of the upper mold by shafts of a single pressing means. Through subsequent study and research, such information was obtained, such as it being difficult to secure a balance of the movable supporting member with single-point supporting of the position of the center of gravity on the lower surface of the movable supporting member in a case where a molding article is large with its side exceeding, for example, 15 cm, or where an insert itself is large (for example, one side thereof exceeds approximately 20 cm). That is, in the case of insert molding of such a large-sized molding article or by such a large-sized insert, it was found that, with control made by single-point supporting of the movable supporting member, it was difficult to carry out stabilized injection molding in which no burrs are produced.

As has been made clear in the above description, it is therefore an object of the present invention to provide an insert molding method and a metal mold, which are capable of carrying out stabilized insert molding, in which no burrs are produced, even in insert molding of a large-sized molding article or by a large-sized insert.

DETAILED DESCRIPTION OF PREFERRED EMBODIMENTS

A detailed description is given of embodiments of the invention with reference to accompanying drawings.

Figure 1:
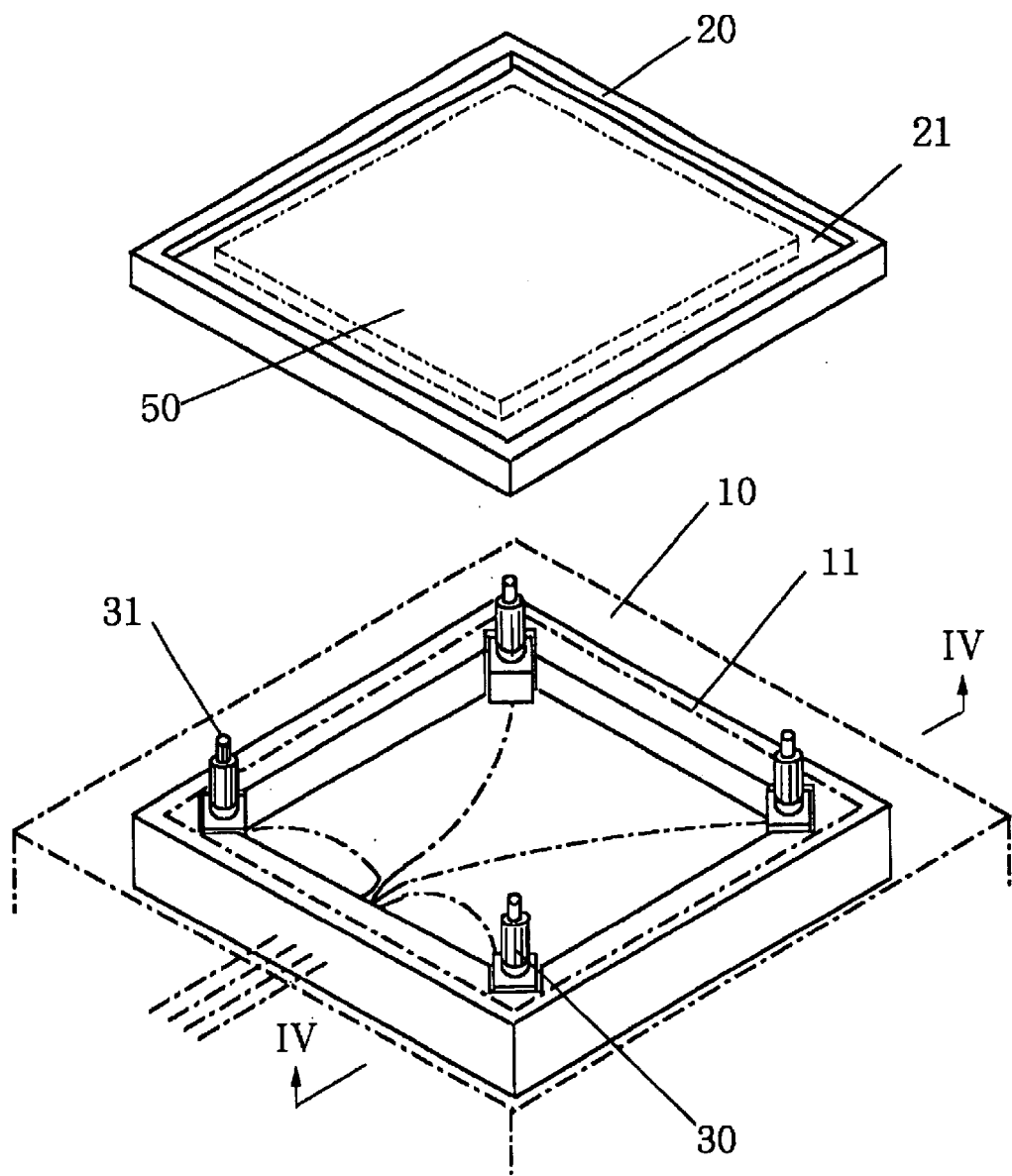
FIG. 1 is a perspective view of the major parts of a metal mold according to the invention.
Figure 2:
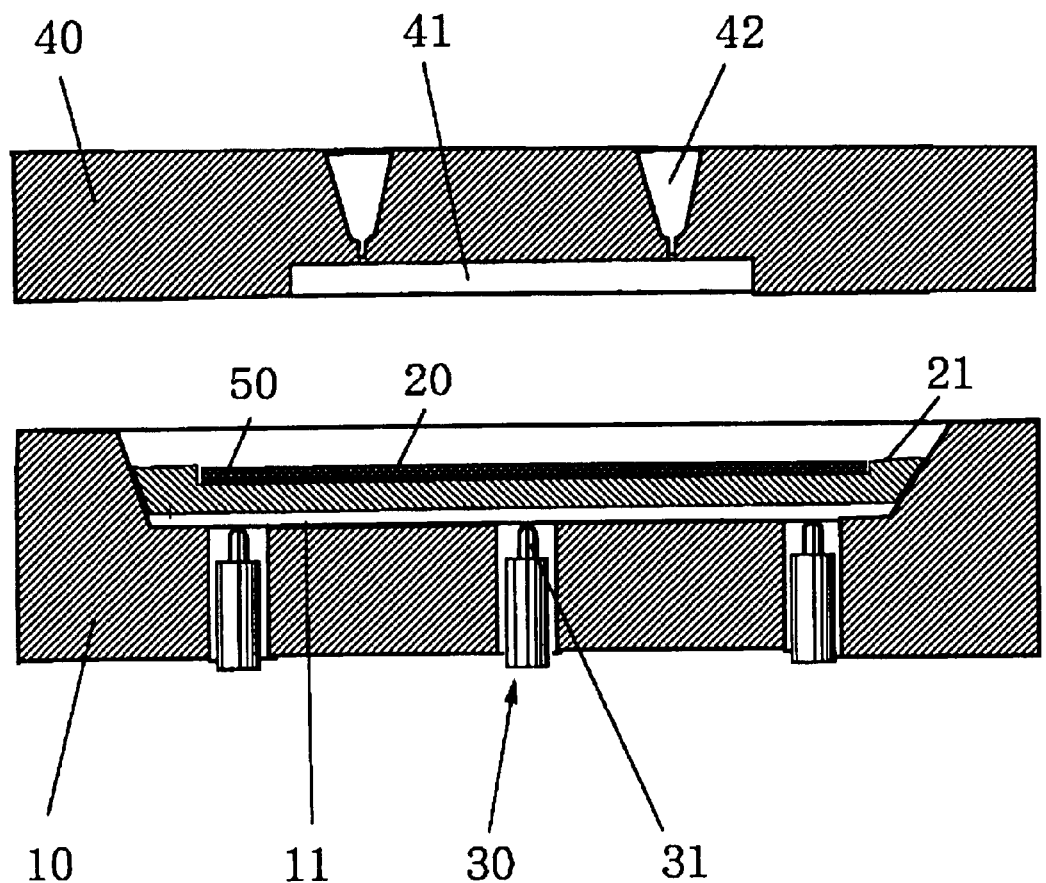
FIG. 2 is an outlined perspective view of a metal mold according to the invention.

As shown in FIG. 1 and FIG. 2, a metal mold for insert molding according to the invention is featured in a construction at the lower mold 10 side. That is, a movable supporting member 20 having flexibility is vertically movably disposed in a recess 11 on the upper surface of a lower mold 10 and is pressed and moved in the direction of an upper mold 40 by respective shafts 31 of a plurality of pressing means 30 each being composed of a hydraulic jack, which is disposed on the underside of the movable supporting member 20.

An insert 50 is placed on the upper surface of the movable supporting member 20. As shown in FIG. 1, the recess 21 is formed on the upper surface of the movable supporting member 20, and the recess 21 is used to position the insert 50 when the same insert 50 is placed thereon. Also, for a convenience of the drawing, although it seems that there is a gap between the wall surface of the recess 21 and the side of the insert 50, in actuality, there is no gap therebetween.

Recesses may be formed at the positions that are brought into contact with the tip ends of respective shafts 31 of a pressing means 30 on the rear side of the bottom of the movable supporting member 20 so as to correspond to the shape of the tip end portions of the corresponding shafts 31. In addition, it may be constructed that the tip ends of the shafts 31 and the bottom surface of the movable supporting member 20 are adsorbed by each other by an electromagnetic force or a electrostatic force, and furthermore, these are brought into contact with each other with positioning pins intervened therebetween.

Also, as a matter of course, the kinetic structure of the movable supporting member 20 is required so as to stand against an injection force of a melted resin or rubber material as a part of a metal mold for injection molding.

The number and arraying position of the pressing means 30 are four in total with one provided at the respective corners of the insert 50 as one example as shown in, for example, FIG. 1. However, the number and arraying position thereof are not limited to the example shown in FIG. 1, wherein the number and arraying positions thereof may be subjected to various designs and/or modes of, for example, eight in total with two provided at the respective corners, or sixteen in total with two further provided at respective sides, or another mode consisting of some pressing means provided at the middle portion. In summary, the number and arraying positions of the pressing means may be acceptable, which can meet a requirement by which the entire insert 50 is uniformly pressed to the upper mold 40 side via the movable supporting member 20 having flexibility.

A plurality of pressing means 30 disposed are constructed so that the hydraulic pressure of each of the pressing means 30 is independently controlled. Therefore, as shown in, for example, FIG. 2, if the respective pressing means 30 are actuated in a state where the insert 50 is placed in the recess 21 on the upper surface of the movable supporting member 20, the lower mold 10 is elevated, and the upper surface of the lower mold 10 is brought into close contact with the underside of the upper mold 40, the upper ends of the shafts 31 of the pressing means 30 are brought into contact with the underside of the movable supporting member 20, wherein since the movable supporting member 20 is moved in the direction of the upper mold 40 while preventing a horizontal movement of the movable supporting member 20, the upper surface of the insert 50 is brought into contact with the underside of the upper mold 40. At this time, pressure that is applied to the respective pressing means 30 is set to a uniform pressure level.

The plan shape of the movable supporting member 20 may be free, for example, rectangular, polygonal, or circular, and the plan shape of the recess 11 on the upper surface is similar to that of the insert 50.

With the above-described operations, if there exists, for example, a portion whose thickness is not uniform on a part of the insert 50 surface, although a thick portion of the insert 50 is brought into contact with the underside of the upper mold 40, a thin portion thereof is not in contact with the underside of the upper mold 40. And, the thick portion at which the upper surface of the insert 50 is in contact with the underside of the upper mold 40 operates just like a stopper, wherein although the pressing force of the pressing means 30 does not operate any longer, the pressing force of the pressing means 30 further operates at the thin portion not in contact with the underside of the upper mold 40. Therefore, the movable supporting member 20 at the thick portion may be subjected to further bending deformation, resulting in the upper surface of the thin portion of the insert 50 being brought into contact with the underside of the upper mold 40. Finally, the entire upper surface of the insert 50 can be brought into close contact with the underside of the upper mold 40.

The above description explains a case where a portion, having an uneven thickness, of the insert 50 is small, wherein there is no need for the pressing forces of a plurality of pressing means 30 to be individually controlled. However, in a case where a portion having an uneven thickness is large, it is preferable that the pressing forces are individually controlled, and the respective pressing means 30 are operated so that the respective surfaces of the insert 50 are uniformly brought into contact with the underside of the upper mold 40.

It can be judged as shown below whether or not the thickness of the insert 50 is not uniform at a part thereof, and a gap is produced between the upper surface of the insert 50 and the underside of the upper mold 40. That is, if the insert 50 is uniform in a case where the respective pressing means 30 are operated with uniform pressure, the entire upper surface of the insert 50 is brought into contact with the underside of the upper mold 40 at the same time. Resultantly, the amounts of movement of the shafts of the pressing means 30 become equal to each other. To the contrary, if the amounts of movement of the shafts 31 of the pressing means 30 are equal to each other where the insert 50 is provided with parts having an uneven thickness, a stopper operates on the pressing force of the shaft 31 at a part having a large thickness earlier than that at the shaft 31 having a small thickness. The difference can be known by detecting the amounts of movement of the respective shafts 31 of the pressing means 30. Further, where the amount of movement of the shaft 31 of a certain pressing means 30 is remarkably large or small, it can be recognized that the unevenness of the insert 50 is remarkable. In such a case, it is possible to remove an unsuitable insert 50 by suspending the molding and opening the molds.

With the above-described operations, that is, if detection of unevenness in the thickness of the insert 50, judgement of permissible unevenness or non-permissible unevenness with respect to the thickness, and exclusion of an unsuitable insert 50 are carried out by automatic control, this is advantageous in maintaining quality, improving production efficiency and decreasing production losses.

As has been made clear in the above description, in the present invention, the movable supporting member 20 is not made of a rigid body as in the prior arts, but it is important for the movable supporting member 20 to have flexibility. The flexibility is, for example in an embodiment as shown in FIG. 1, such that the movable supporting member 20 has flexibility when it is measured at a distance equivalent to the distance of the pressing means 30 prepared at adjacent positions and diagonal positions. It does not mean that the movable supporting member 20 is flexible in a range of, for example, several centimeters, centering around a point with which the tip end of the shaft 31 of the pressing means 30 is brought into contact. In the latter mode, a projection is formed only at a portion with which the tip end of the shaft 31 is brought into contact, and clearance is produced at the surrounding thereof. This is disadvantageous.

Figure 3A:
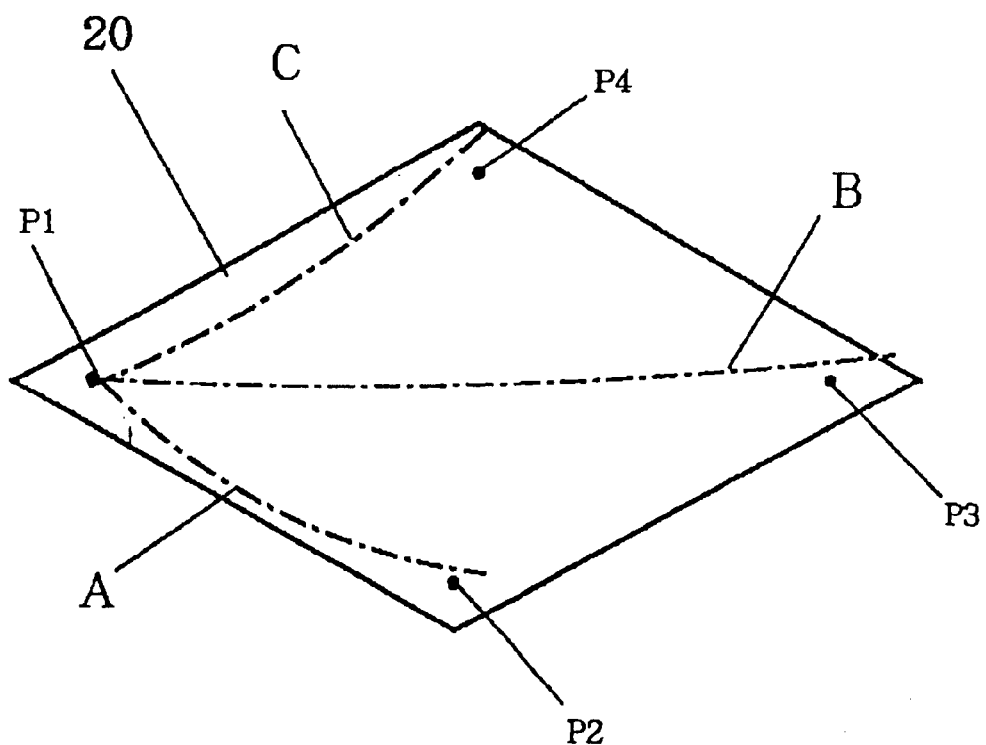
FIGS. 3A and 3B are general views explaining flexibility of a movable support member.
Figure 3B:
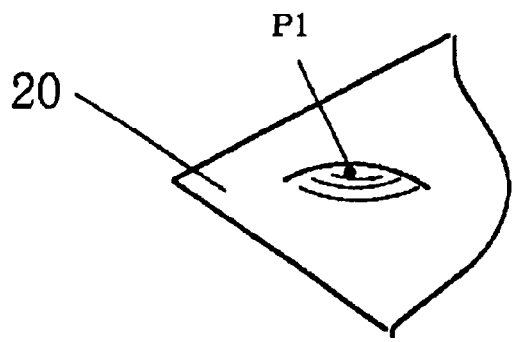
Figure 4A:
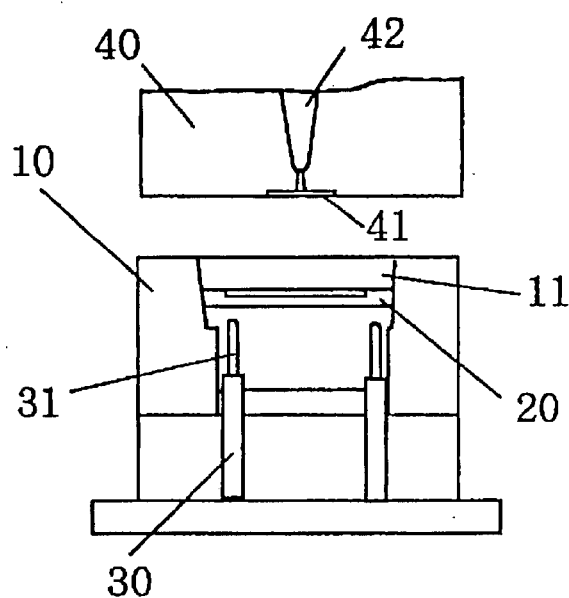
FIGS. 4A–4D are general views showing a cycle of injection molding by using a metal mold according to the invention.
Figure 4B:
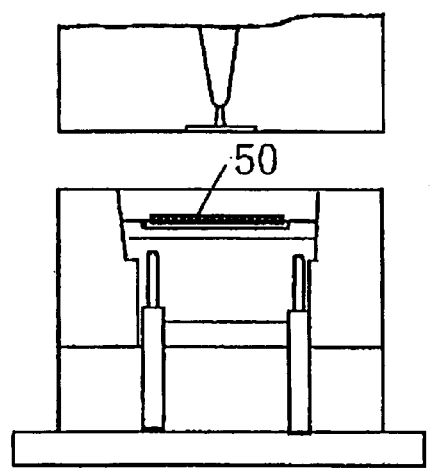
Figure 4C:
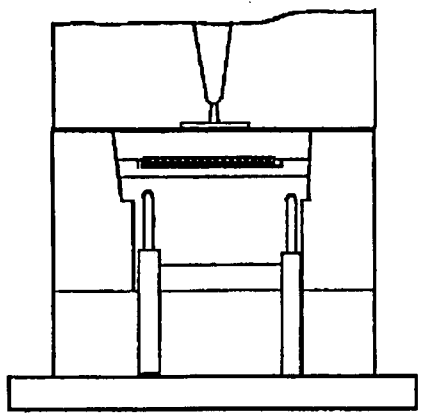
Figure 4D:
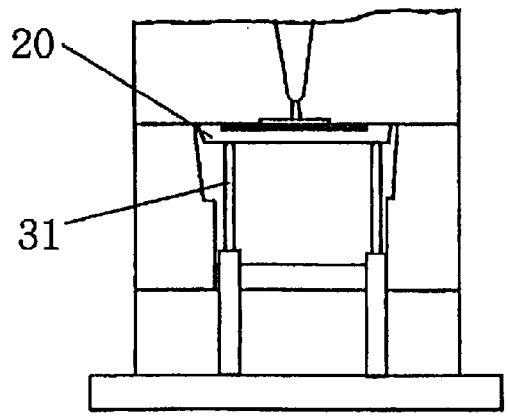

A description is given of the flexibility with which the movable supporting member 20 should be provided, in compliance with FIG. 3. Flexibility means a characteristic of bending and deforming due to an external force and returning to its original shape by removing the external force. In order for the movable supporting member 20 to have flexibility, it is necessary that the material (for example, a metallic plate having a resiliency like a spring) and a shape dimension so as not to lose flexibility are established.

At the movable supporting member 20 shown in a schematic view, points P1 through P4 are shown, with which the tip ends of the shafts 31 of the pressing means 30 are brought into contact on the underside of the bottom. Lines A through D shown by hypothetical lines in FIG. 3-A, respectively, indicate the directions of deformation of the movable supporting member 20. For example, line A indicates deformation between point P1 and point P2 (point P2 side is deformed upwards), line B indicates deformation between points P1 and P3 (point P3 side is deformed upwards), and line C indicates deformation between points P1 and P4 (point P4 side is deformed upwards)

The deformation between the above-described points is produced in a combined state although not being illustrated. FIG. 3-B shows that the deformation indicating the flexibility of the movable supporting member 20 is not of such a character as shown in a projection locally produced at a portion of, for example, point P1.

Figure 5E:
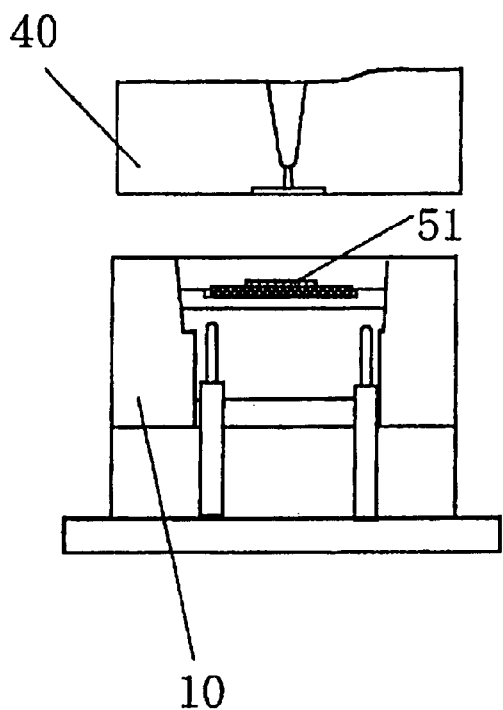
FIGS. 5E and 5F are general views showing a cycle of injection molding by using a metal mold according to the invention.
Figure 5F:
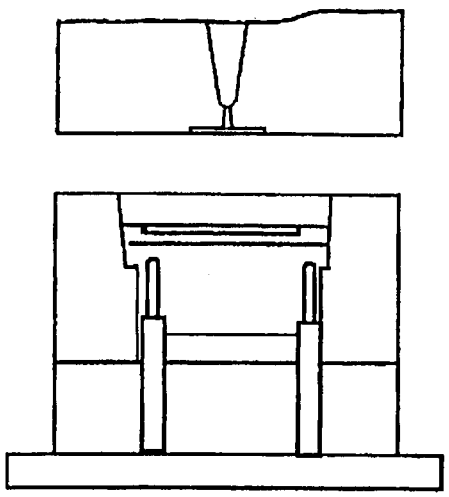

Based on views A through F in FIG. 4 and FIG. 5, a description is given of a cycle of insert molding for which an insert molding metal mold according to the invention is used. Also, the cross section shown therein is indicated by the line IV—IV in FIG. 1.

FIG. 4-A shows a state where the lower mold 10 is open below the upper mold 40, wherein a gate 42 that becomes a resin flow pass and a cavity 41 that becomes a resin-molding portion are prepared at the upper mold 40. On the other hand, a recess 11 is formed at the upper end side of the lower mold 10, and a movable supporting member 20 is disposed therein. The tip ends of shafts 31 of pressing means 30 are disposed so as to be brought into contact with the bottom of the movable supporting member 20.

FIG. 4-B shows a state where an insert 50 is disposed on the upper surface of the movable supporting member 20. The insert 50 may be manually or automatically disposed.

As shown in FIG. 4-C, as the insert 50 is completely disposed, the lower mold 10 is moved toward the upper mold 40, wherein the molds are being tightened.

As shown in FIG. 4-D, as the molds are completely tightened, the pressing means 30 are driven to elevate the shafts 31. When the tip ends of the shafts 31 are brought into contact with the bottom of the movable supporting member 20 and are further elevated, the movable supporting member 20 is accordingly elevated to cause the upper surface of the insert 50 to come in contact with the underside of the upper mold 40. At this time, where a difference is produced in thickness at both sides of the insert 50, the movable supporting member 20 that is pressed by the tip ends of the shafts 31 is deformed in such a direction as to remove the difference in thickness of the insert 50. That is, the movable supporting member 20 is bent and deformed in such a direction that the thinner portion of the insert 50 is raised, whereby it is possible to prevent clearance on the contacting surface between the underside of the upper mold 40 and the insert 50 from occurring.

Figure 6A:
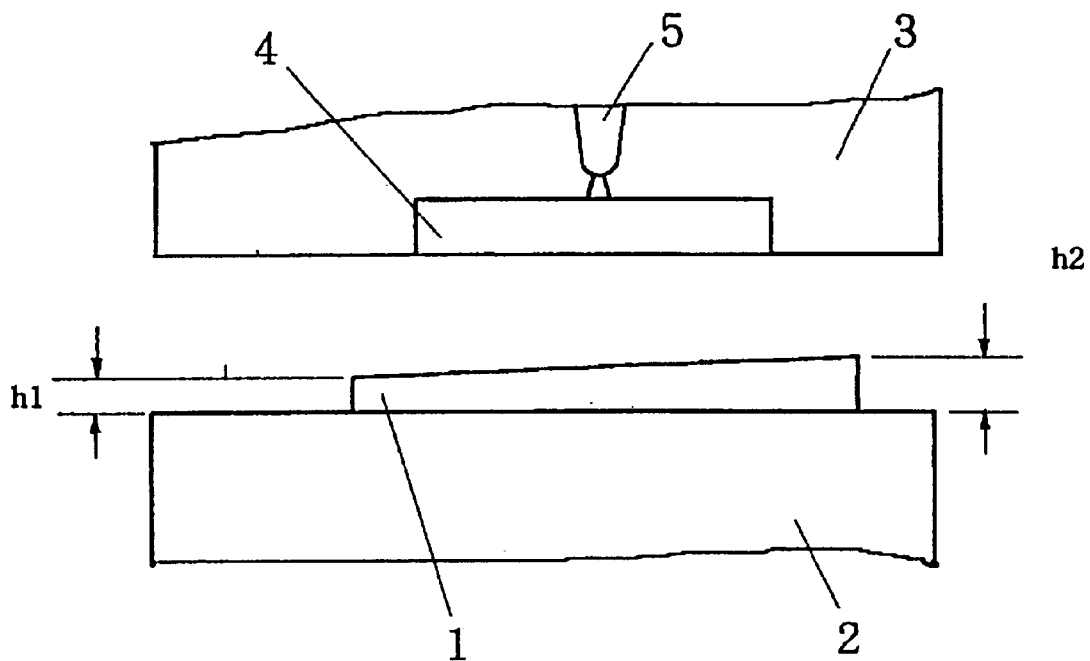
FIGS. 6A and 6B are views explaining the prior art example.
Figure 6B:
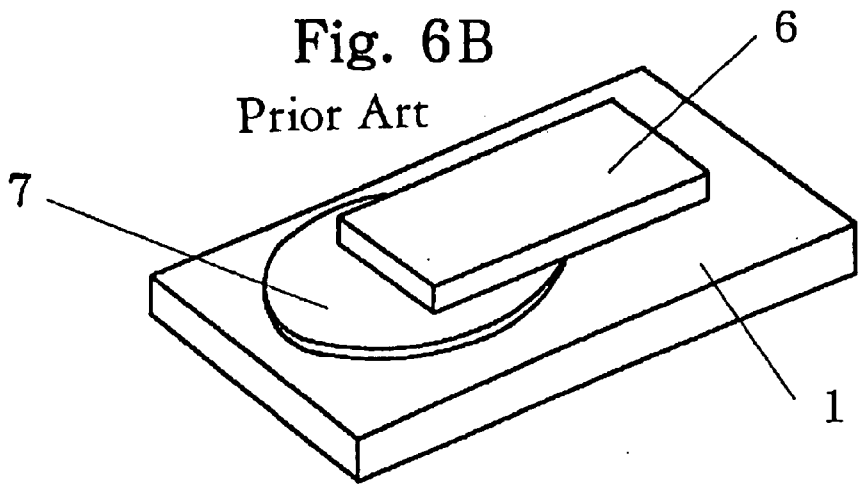

A further description is given of the above-described action. Where there is a partial difference in thickness at the insert 50, when the insert 50 is moved toward the upper mold 40, a thicker side of the insert 50 (h2 in FIG. 6, hereinafter, this is the same) is first brought into contact with the upper mold 40, and as the shaft 31 that presses a thinner side (h1 in FIG. 6, hereinafter, this is the same) further continuously presses the thinner side thereof, the movable supporting member 20 is bent and deformed, until h1 and h2 are brought into surface contact with the underside of the upper mold 40, at a span from the base point of the contacting position side of the top point of the above-described h2 to the thinner side (h1).

In a state shown in FIG. 4-D, a synthetic resin and the like are injected through a gate 42, and the cavity 41 is filled with the synthetic resin.

FIG. 5-E shows a state where the molds are opened after waiting for cooling (solidification) of the filled synthetic resin at an appointed period of time. A molded product is manually or automatically taken out. Also, in the mode of the invention shown in FIG. 5-E, the movable supporting member 20 is dropped onto the bottom of the recess 11 by operating the pressing means 30 in interlock with the opening of the molds and lowering the shafts 31. However, the operation may be carried out in the order of mold opening, removal of molded products and dropping of the movable supporting member 20.

FIG. 5-F shows the initial state, that is, returning to the state shown in FIG. 4-A. One cycle of injection molding is completed through the above operations.

According to the invention, such an effect is brought about, which can solve problems of defective molding such as occurrence of burrs, which may occur in a large-sized molded article or insert molding by using a large-sized insert as described in detail in the object of the invention.

(Remarks) Reference numbers in the drawings indicate the following:

| 10 | Lower mold |
| 11 | Recess for disposing a movable supporting member |
| 20 | Movable supporting member |
| 21 | Recess for placing an insert |
| 30 | Pressing means |
| 31 | Shafts |
| 40 | Upper mold |
| 41 | Cavity |
| 42 | Gate |

-continued

| 50 | Insert |
| 51 | Molded article |
| h1 | Thickness of an insert |
| h2 | Thickness of an insert |

What is claimed is:

1. A metal mold being utilized in an insert molding method for injection molding of resin or rubber at an insert set in a lower mold by injecting and filling melted resin or rubber into a cavity of an upper mold through a gate in a state where said upper mold and lower mold are disposed so as to be opposed to each other, a movable supporting member having flexibility, on which said insert is placed, is vertically movably disposed in a recess formed on an upper surface of said lower mold, and the underside thereof is supported by the tip ends of shafts of a plurality of pressing means that independently operate, and said movable supporting member is moved while being pressed by said respective shafts of said pressing means to said upper mold at a plurality of positions, said movable supporting member is bent and deformed.

2. The insert molding metal mold as set forth in claim 1, wherein said movable supporting member for setting an insert has flexibility at least between shafts of a plurality of pressing means.

* * * * *